A. C. VAUGHAN.
Nut-Lock.

No. 212,769. Patented Feb. 25, 1879.

WITNESSES:
W. W. Hollingsworth
Edw. W. Byrn

INVENTOR:
A. C. Vaughan
BY
ATTORNEYS.

UNITED STATES PATENT OFFICE.

AARON C. VAUGHAN, OF SHANE'S CROSSING, OHIO.

IMPROVEMENT IN NUT-LOCKS.

Specification forming part of Letters Patent No. 212,769, dated February 25, 1879; application filed November 26, 1878.

*To all whom it may concern:*

Be it known that I, AARON C. VAUGHAN, of Shane's Crossing, in the county of Mercer and State of Ohio, have invented a new and Improved Nut-Lock; and I do hereby declare that the following is a full, clear, and exact description of the same, reference being had to the accompanying drawings, forming part of this specification, in which—

Figure 1:
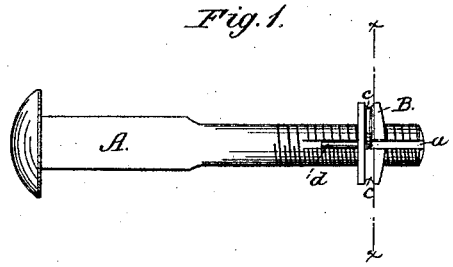
Figure 2:
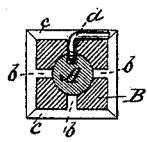
Figure 3:

Figure 1 is a side view; Fig. 2, a cross-section, taken on the line $x\ x$, through the nut. Fig. 3 is a detail view of the locking-key.

The object of my invention is to provide a simple and effective nut-lock, or device for securing a nut to the screw-threaded end of a bolt so that it cannot be accidentally displaced by jar or strain.

To this end my improvement consists in grooving the bolt longitudinally and across its threads, grooving the face of the nut radially from its central perforation, grooving the angular edges of the nut, and combining with the same a wire key, which is inserted longitudinally in the groove in the bolt and bent at right-angles into one of the radial grooves of the nut to prevent the latter from turning, and is again bent at right-angles into the groove in the edge of the nut to prevent the said wire key from jarring out longitudinally, all as hereinafter more fully described.

In the drawings, A represents a bolt having a screw-threaded end, which is grooved longitudinally at $a$. B is the nut, which is provided with grooves $b$ in its face, radiating from its central perforation, and having a groove or channel, $c$, extending around its angular edge.

To lock this nut upon the bolt after it is screwed up, a straight piece of wire, $d$, is inserted longitudinally into the groove of the bolt, is then bent up at right angles into one of the radial grooves of the nut, and is again bent at right angles in the plane of the nut into the groove on the edge of the same.

The bend of the wire from the groove of the bolt into the radial groove of the nut, it will be seen, locks the nut and prevents it from turning, while the other bend into the marginal groove in the edge of the nut locks the wire key and prevents its slipping or jarring out of the longitudinal groove in the bolt.

In defining my invention with greater clearness, I would state that I do not claim, broadly, the grooving of the bolt longitudinally, nor the employment of a radially-grooved nut and key in combination therewith. The grooving of the nut upon its angular edge, however, and the bending of the wire into the same serve to effectually secure the key in its place, without which the simple locking of the nut is of no value, on account of the tendency of the key to jar out.

By means of my invention, it will be seen that a simple, complete, and effective locking device is provided, which may be cheaply made and easily applied or removed.

Having thus described my invention, what I claim as new is—

A nut-lock consisting of a longitudinally-grooved bolt, a nut having one or more radial grooves in its face and a groove or locking-seat about its edge, together with a wire key arranged in the longitudinal groove of the bolt and bent twice at right angles in the plane of the nut, all combined substantially as and for the purpose described.

AARON C. VAUGHAN.

Witnesses:
ISAAC WISTEMAN,
D. H. ROBISON.